United States Patent [19]
Smith-Johannsen et al.

[11] 3,992,558
[45] Nov. 16, 1976

[54] PROCESS OF COATING PARTICLES OF LESS THAN 20 MICRONS WITH A POLYMER COATING

[75] Inventors: Robert Smith-Johannsen, Portola Valley; Wendell W. Moyer, Jr., Atherton, both of Calif.

[73] Assignee: Raychem Corporation, Menlo Park, Calif.

[22] Filed: May 10, 1974

[21] Appl. No.: 468,668

[52] U.S. Cl. .............................. 427/213; 427/221; 428/404; 428/407
[51] Int. Cl.² .......................................... B05D 7/00
[58] Field of Search ........ 117/100 B, 100 S, DIG. 6; 427/185, 213, 221; 428/404, 407

[56] References Cited
UNITED STATES PATENTS

| | | | |
|---|---|---|---|
| 2,728,732 | 12/1955 | Arnett et al. | 117/100 S |
| 3,085,905 | 4/1963 | Prevot et al. | 117/100 S |
| 3,128,196 | 4/1964 | Pierpoint | 117/100 S |
| 3,219,476 | 11/1965 | Robbins | 117/100 B |
| 3,241,520 | 3/1966 | Wurster et al. | 117/DIG. 6 |
| 3,253,944 | 5/1966 | Wurster | 117/100 A |
| 3,345,323 | 10/1967 | Endres et al. | 117/100 C |
| 3,377,189 | 4/1968 | Acker | 117/100 S |
| 3,386,851 | 6/1968 | Harlan | 117/100 B |
| 3,408,746 | 11/1968 | Reynolds et al. | 117/100 B |
| 3,661,620 | 5/1972 | Dekking et al. | 117/100 B |

Primary Examiner—Ronald H. Smith
Assistant Examiner—Dennis C. Konopacki
Attorney, Agent, or Firm—Lyon & Lyon

[57] ABSTRACT

Disclosed is a process of coating discrete, unagglomerated particles of less than 20 microns with a high polymer coating, and compositions such as conductive compositions using such coated particles. The particles are coated with the polymer in a fluid energy mill such that substantially uniform coated particles are obtained which are free-flowing, non-agglomerative and readily dispersable in a suitable binder.

13 Claims, 1 Drawing Figure

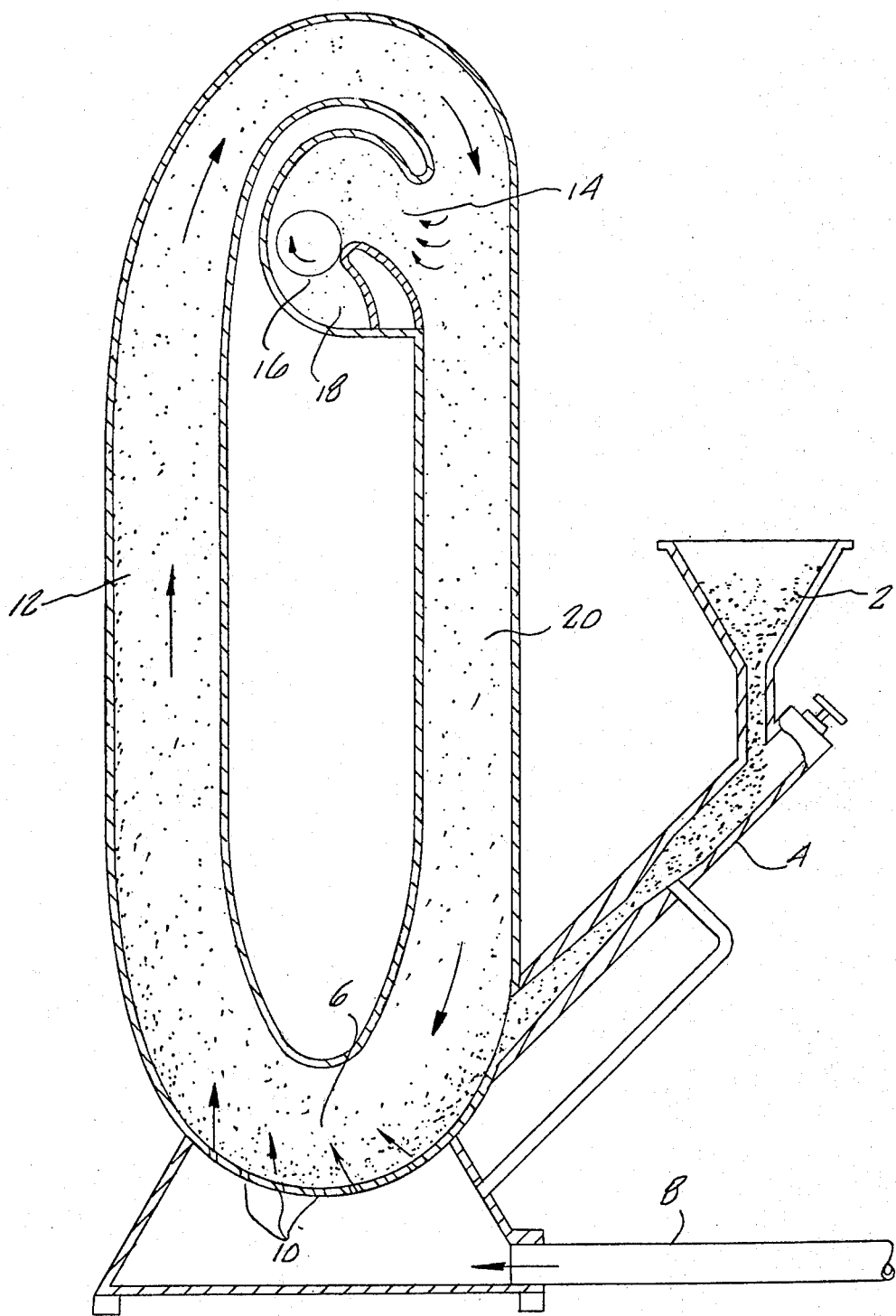

PROCESS OF COATING PARTICLES OF LESS THAN 20 MICRONS WITH A POLYMER COATING

BACKGROUND OF THE INVENTION

Fine particles in the form of powder, 20 microns or less, are used as additives and fillers in a wide variety of compositions such as polymeric and coating compositions. The final properties of the dried or cured composition as well as the ease of dispersion and the amount of filler which may be incorporated into a particular composition are controlled in large measure by the surface properties and particle size of the particular fillers employed. Many small particle size fillers, although possessing suitable properties for particular applications, cannot be used for those applications because they are difficult to disperse, yield highly variable products, can only be incorporated into binders at low pigment volume concentrations, or upon storage in the case of coating compositions, tend to settle and agglomerate rendering the coating compositions useless.

Treating of fine particles with chemicals such as surface active agents to affect the particles' surface properties is not always effective to overcome the above problems. For example, the treating of a filler with an ionic surface active agent to be used in an insulative composition may adversely affect the electrical properties of the composition so it is no longer suitable as an insulation.

Thus, for many applications, it is desirable to alter the surface properties of a particle by coating or encapsulating it in a layer of another material, such as a polymer. If properly coated, the encapsulated particle will exhibit the surface properties of the encapsulating material, such properties often resulting in better wetting properties, ease of dispersion and compatibility with the binder of the polymer or coating composition. Also, for some applications, it is desirable to render the particles readily dispersible in a particular binder yet chemically incompatible with that binder. By coating the surface of the particles with a specific polymer, the final properties of the composition into which the particles are dispersed or blended can be controlled. For example, in the formulation of conductive compositions, fine particle size carbons may be coated with a high polymer which permits the particles to be uniformly dispersed in a plastic, yet be of such a nature as to be incompatible with that plastic. Thus upon annealing, the uniformly dispersed coated conductive particles will be free to reorganize within the plastic matrix so as to form a conductive path. On the other hand, if reinforcement without appreciable conductivity is a desired, the polymeric coating should be one which renders the carbon particle both easily dispersible and compatible with the plastic. Such a coating will cause each individual particle to be completely encapsulated in the plastic matrix, with little agglomeration, resulting in particles completely insulated from one another and with maximum surface area in contact with the plastic for physical reinforcement.

Encapsulation of powders with polymer compositions have, to date, generally been limited to large particle size materials, in the order of 50 microns or greater. See for example *Fluid Flow Analysis* by G. Sharpe, American Elsevier Pub. Co., Inc., N.Y. 1967 at 370; *Drying of Solids in the Chemical Industry* by G. Nonhebel and A. Moss, CRC Press, Cleveland, Ohio (N.D.) at 211; *Unit Operations of Chemical Engineering* by W. McCabe and J. Smith, McGraw-Hill Book Co., N.Y. (N.D. 2nd ed.) at 175; and, *Principles of Unit Operations* by A. Foust et al, Dept. of Chem. Eng., Lehigh University, Bethlehem, Pa. (N.D.) at 480. Such particles may be encapsulated by fluidized bed coating techniques in which the particles are of sufficient size to be held in suspension by an upwardly flowing gas to form a bed of gas-suspended discrete particles. The polymer coating is then atomized into the chamber, coating the particles. Such a process cannot be operated successfully with fine powders. These powders tend to pack together forming large agglomerates, and thus require an excessive gas flow to fluidize the agglomerates in the bed. The excessive gas flow will transport the fine particles out of the chamber.

Attempts have been made to overcome the difficulties with find particles so they may be coated with low visclosity liquids in a fluidized bed. For example in U.S. Pat. No. 3,237,596, an enclosed fluidized bed apparatus is provided which ejects the particles upward, under pressure, through a nozzle so as to reduce agglomeration, at which time they are coated with an atomized liquid sprayed downward, after which the coated with an atomized liquid sprayed downward, after which the coated particles settle into the fluidized bed. Fine particles carried away by the gas flow are caught in filters and recycled to the chamber. Such a technique, although suitable for coating low viscosity liquids onto particles, has been found impractical for the coating of high molecular weight polymers. Another example of efforts to recycle the fine powder carried away by the gas stream is found in U.S. Pat. No. 3,110,626. This apparatus is also unsuited for coating with high molecular weight polymers, for the reason that there is no means provided for frequent high velocity impact of the particles.

In order to ensure that the final product will be only discrete, coated particles, we have found it necessary to cycle the particles so as to cause frequent high velocity impacts between particles and coating, a process which is not possible by the fluidized bed technique. The repeated impacts are in contrast to other high velocity, impact processes. For example, in U.S. Pat. No. 3,009,826, dispersion and coating of agglomerated particles is accomplished by propelling a stream of liquid and solid at supersonic velocities against a barrier causing the solid to disperse and be coated by the liquid. Although such a process recognizes the need for propelling the particles at high speeds, it makes no provision for recycling the particles, thereby relying on a "one-shot" impact for dispersion and coating. More importantly, such high velocity impact against a solid barrier is inapplicable for the coating of high polymers onto particles. The high viscosities and low flow properties of high polymers make such a technique inapplicable since it is difficult or impossible to get a uniform coating in this manner and the polymer-particle mixture will tend to coalesce and agglomerate on impact with the barrier as opposed to separating as dry coated, discrete particles.

Other known methods for preparing polymer coated powders include pan-coating processes, U.S. Pat. No. 3,711,319 and micro encapsulation, as generally described in U.S. Pat. No. 2,800,457. These processes suffer from the similar disadvantage that they are inapplicable for the coating of finely divided particulate matter in the order of 20 microns or less.

The use of a fluid energy mill type apparatus as generally disclosed in U.S. Pat. No. 3,491,954 provides the capability of impacting agglomerated particles and coating at supersonic speeds, continuously recycling the particles at these speeds so as to prevent reagglomeration and separating out only particles of fine partcle size less than 20 microns. Such mills have in the past been used for the grinding, mixing or blending of fine particles. Also, by maintaining the mill at a temperature below the melt temperature of a polymeric material, such mills have been used for the grinding and blending of high polymer particles. However, it was previously thought that the coating of discrete particles with a high polymer in such a mill was impossible, since unlike the grinding of polymeric materials, it was necessary to cause the polymer to melt and flow about each individual particle. It was believed that the high polymer, upon melting, was so highly viscous, that it would not coat each discrete particle, but rather, cause reagglomeration of the particles with the viscous polymer, especially when applied in appreciable quantities. This has been a problem which has plagued other prior art techniques, and it was thought that the particle-polymer agglomerate would quickly clog the mill and deposit on the sides of the chamber. For this reason, the use of fluid energy mills to coat discrete particles has been limited to liquid or molten low molecular weight materials, used in sufficiently small quantities that they would not cause reagglomeration or coalescence upon the walls of the chamber. Previously, use of a fluid energy mill to coat free-flowing powders has been limited to coating with compositions such as fatty acids, other surface active agents or waxy materials. An apparatus particularly suited for coating particles with low molecular weight materials is discussed in U.S. Pat. No. 3,550,868.

We have now discovered that the use of an apparatus which circulates particles at about supersonic speeds may be used to coat high polymers on small discrete particles, as was heretofore thought impossible.

One application for finely divided coated particulate material in which non-coated particles suffer from all the problems previously discussed, including difficulty of dispersion, agglomeration, and storage stability, are compositions containing carbon blacks. Carbon particles are very fine, sub-micron in diameter. Carbon particles have found wide application in the formulation of conductive compositions in which they are incorporated at high concentrations into a nonconductive binder to render the composition conductive. Such carbon particles generally have high oil absorption characteristics, are difficult to disperse, and readily agglomerate and settle if dispersed in a fluid binder. On account of these characteristics, the amount of carbon which may be dispersed in a particular formulation is generally limited, which in turn limits the conductivity which can be obtained for such coatings. In addition, since many of the carbon or other conductive particles are inadequately dispersed, or have agglomerated upon standing, the conductivity of the final coating is highly variable and irreproducible. Thus, it is apparent that there is a need for conductive particles with predictable and constant electrical properties when dispersed in a binder composition.

As previously discussed, in order to achieve conductive compositions with predictable and constant electrical properties, particles with very specific surface characteristics should be utilized. Generally, the particles should be readily dispersible in the binder to result in a uniform composition, yet be sufficiently agglomerated so as to provide a uniform conductive path throughout the composition.

It is thus an object of this invention to provide fine particles of less than 20 microns having a high polymer coating thereon, such coated particles being free-flowing, non-agglomerative and readily dispersible in a coating or polymeric composition including dry plastics. Selection of the polymer coating will be dictated by the material into which it is to be dispersed, compatibility or non-compatibility of the coating with the binder composition being a major criteria.

It is another object of this invention to provide a high polymer coating on conductive particles of less than 20 microns, such that the particles are free-flowing and readily dispersible, but yet not so encapsulated as to render the particles nonconductive.

It is another object of this invention to provide conductive coating compositions which may be filled with finely divided conductive particles at higher levels than were previously obtainable.

SUMMARY OF THE INVENTION

These and other objects are accomplished by injecting the particles to be coated, and a high polymer into a fluid energy mill, said mill dispersing, impacting, suspending and thereby coating the particles and optionally drying the coated particles if a solvent has been used, via a fluid stream which is injected into the mill under pressure and at elevated temperatures. The fluid stream causes the particles to be dispersed and the high polymer to flow and fuse onto the dispersed particles when they impact on one another, after which the particles are dried if a solvent has been employed, and ultimately separated out of the mill as dry, free-flowing particulate matter.

In the case of finely divided conductive carbons, the particles so coated may be readily dispersed into a conductive composition, at higher levels than was heretofore possible.

BRIEF DESCRIPTION OF THE DRAWING

FIG. 1 is a section of a fluid energy mill utilized in accordance with this invention.

PREFERRED EMBODIMENT

In order to coat finely divided particles of less than 20 microns with high polymers, a fluid energy mill, as manufactured by Fluid Energy Processing and Equipment Company, Lansdale, Pa., is employed. Such a mill, heretofore, has been used for dispersing or grinding dry material, drying, and coating chemicals such as waxes, oils, and colorants onto particles. We have discovered that by utilizing the dispersing, heating, impaction, and drying capabilities of such a mill, high polymers may be brought together with initially agglomerated fine particles in such a way that the high polymer is coated onto the fine particulate matter, after which it is suspended, dried (if solvent is present) and separated from the mill to yield free-flowing coated particles. By high polymer is meant a material having thermoplastic properties and of sufficient molecular weight as to yield a self-supporting film having a tensile strength and Young's modulus of at least about 80% of that which is obtained in the molecular weight range where such physical properties become substantially independent of moleclar weight for that particular polymer. The molecular weight and melt viscosity will of course vary with the particular polymer utilized, but for any material, the molecular weight should be sufficient to form a self-supporting film. Thus, in the case of polyethylene, molecular weights on the order of 6,000 or higher, are contemplated by this invention.

The quantity of high polymer which can be coated onto a particulate solid by one or more of the following procedures may be remarkably high. The percentage of final powder product which is the coating polymer may range from less than 1 to greater than 50% by weight.

Turning now to FIG. 1, a cross-section of a fluid energy mill is shown. The high polymer, in a suitable form, and the particles to be coated are fed into hopper 2, which are drawn into the coating chamber 6 via a venturi feeder 4. The particles and polymer may be fed into the same feeder, as shown, or may be injected via separate inlets. Also, it will be understood that the coating polymer may be fed into the chamber in any suitable form, including as a solvent solution, a finely divided powder, or a gel. The choice of form will generally depend on such factors as the polymer's solubility, melting point, molecular weight, crystallization tendencies, melt and solution viscosities. The various suitable polymer forms will be further discussed below.

Referring again to FIG. 1, a fluid stream is fed into the chamber through nozzles 10, the nozzles being so configured to cause the fluid to flow tangentially around the arcuate chamber. The fluid is fed at elevated temperatures and pressures and entrains the polymer and particles. The polymer and particles, at the lower portion of the chamber 6, are caused to collide so as to disperse the agglomerated particles and coat the polymer onto the particles. The preferred carrier gas is steam which is injected through the nozzles at 3 to 70 psi at a temperature of 125° C to 400° C. The particles are then carried by the fluid along the chamber in an arcuate path, generally designated 12, with the finely dispersed coated particles settling to the interior and the agglomerated particles being forced to the exterior of the chamber by centrifugal force. The particles settling to the interior of the chamber are caused to flow through outlet 14, after which they must pass through a predetermined opening defined by member 16, and through outlet 18. Particles which do not pass through the opening defined by member 16, as well as particles which have been centrifugally forced to the outer regions of the chamber are returned via path 20 to coating chamber 6 for further, dispersion, coating and recycling.

One suitable form for the polymer is as a solution in an appropriate solvent. The polymer solution may be either preblended with the particles to be coated after which it is introduced into the mill, or the particles and the solution may be fed into the mill through separate inlets, the rate of feed of both materials being metered to control the quantity of the final particle coating. The solvent should desirably be immiscible with the fluid carrier in the mill. Thus, where the fluid carrier gas is steam, non-polar organic polymer solvents, such as xylene, are commonly used. For the most efficient operation, solutions of high solids and low viscosity are preferred. By minimizing the amount of solvent in the solution, a minimum heat loss drying in the mill results. Lower viscosity solutions also allow for easier metering and pumping if the coating solution is injected via a separate inlet.

Where the particulate powder and the polymer solution are preblended, the amount of particulate powder should be sufficient to give a dry or damp crumb-like consistency. Where lesser amounts of powder are used, so as to yield wet thick slurries, poor feeding and plugging of the inlet often results and should be avoided. As a consequence, the amount of coating polymer applied by this technique is limited. The amount of particles which can be incorporated into the preblended will vary depending on the particles themselves.

Another suitable form for the polymer is as a gel of the polymer in an appropriate solvent. This process contemplates the preblending of a polymer gel in finely divided form with the particle to be coated, and then feeding the mixture into the mill. Because the polymer solution is in a gelled form, higher loadings of polymer are possible than if a solution were used. This particular realization of the process is, of course, limited to those polymers which dissolve in certain solvents when hot, but form gels when cool. Polyethylene and polyethylene copolymers are especially suitable for this application. The concentration of the polymer in the gel is governed by the character of the gel at room temperature, as well as the hot solution viscosity. To be useful, the cool gel must be friable, so that it may be broken up for preblending with the particulate powder. In practice, it has been found that low density polyethylene and polyethylene copolymers work well at about 20% polymer concentration. High density and higher molecular weight polyethylenes require a lowering of the solids content to the 10 to 15% range.

Greater amounts of polymer can be applied when preblends are prepared using polymer gels rather than polymer solutions. The gel effectively holds the solvent and reduces its wetting capacity for the particulate powder. Nevertheless, the amount of polymer which can be applied by the polymer gel preblend technique is also limited. Coarser particles, i.e. 1 to 20 $\mu$ in diameter, can hold in general up to 100% by weight of polymer gel. In the case of very fine particles such as carbon or hydrated silica gels, the particulate powders can accept 200% by weight or more of a 20% polyethylene gel in xylene and remain relatively dry.

Another suitable form for the polymer is a dry polymer powder. The dry polymer powder may be blended with the particle to be coated, or alternatively, may be fed into the fluid energy mill by separate inlets.

When the particles to be coated and the coating polymer are preblended, it is important that they be uniformly mixed so as to attain a uniform and finely divided blend of materials. We have generally used a Patterson-Kelley Liquid-Solids Blender for this purpose.

When the polymer has been fed into the fluid energy mill as a solution or polymer gel, the temperature of the fluid should be sufficient to cause the gel to melt and the solvent to evaporate after being coated upon a dispersed particle. Although the exact mechanism may differ, the process is believed to involve the follow sequence: I1) melting of the gel particles (if present); (2) collision of the molten gel (solution) with the particle; (3) flow of the molten polymer solution around the particle; (4) drying of the solvent.

Where the polymer is fed in as a dry powder, the fluid temperature should be sufficient to cause the polymer to melt and flow around the dispersed particles. Generally, in order to be fed in as a dry polymer, the polymer should have a melting point in the range of 50°–200° C, a melt index of from 5–100 in the case of polyethylene, and have a particle size of from 1–500 microns. Pulverized polyethylene and polyethylene copolymers have been found to function well in this process.

Although any polymer capable of forming a self-supporting film may be used in accordance with this invention, polymers such as polyethylene, copolymers of polyethylene, polypropylene, ethylene-propylene copolymers, other polyolefins, polyvinylidene fluoride, polytetrafluoroethylene, polychlorotrifluoroethylene, various fluorine-containing copolymers (e.g. copolymers of tetrafluoroethylene) and hexafluoro propylene, polyvinyl chloride, copolymers of polyvinyl chloride, polyvinylidene chloride, silicones, acrylates, methacrylates, polyamides, polyesters, polyimides, polycarbonates, polyethers, polyketones, phenolic resins, polyisobutylene, polystyrene, styrene copolymers, polyvinyl acetate, polyvinyl acetate copolymers, polysulfones, polyacrylonitrile, polyoxymethylene, polyurethanes, polyamines, polybutadiene, butadiene copolymers, polyisoprene, and neoprene are particularly suitable.

Any fine particulate material may be coated via this process, although particularly suited for coating are carbon blacks, graphite, fine clays, talc ground limestone, aluminum oxide, hydrated aluminum oxide, silicas, hydrated silica gels and iron oxide. Also, fine organic powders used in the formulation of coatings and plastics may also be coated via this process. Of particular interest is the coating of halogenated organic materials useful as fire retardants in coating and plastic formulations. Suitable halogenated organic compounds include compounds of the formula

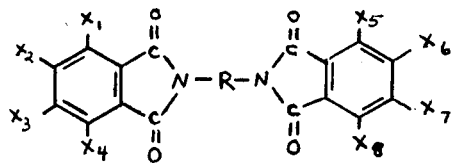

wherein $X_1$ through $X_8$ which can be the same or different are independently hydrogen, fluorine, chlorine, bromine, or iodine, and wherein at least one of $X_1$ to $X_4$ and also at least one of $X_5$ to $X_8$ is chlorine or bromine and wherein R is $C_1$ to $C_{20}$ alkenyl; $C_6$ to $C_{20}$ cycloalkenyl; $C_6$ to $C_{20}$ arylene or halogen substituted arylene or alkyl substituted arylene or fused ring arylene, or the moiety $R_1$-Z-$R_2$ wherein $R_1$ and $R_2$, which can be the same or different, are independently $C_1$ to $C_{20}$ alkenyl; $C_6$ to $C_{20}$ cycloalkenyl; $C_6$ to $C_{20}$ arylene, halogen substituted arylene, alkyl substituted arylene, or fused ring arylene, and wherein Z is sulfur, oxygen, isopropylidene, or a chemical bond joining $R_1$ and $R_2$.

Also of particular interest is the coating of conductive particles such that they are free-flowing and readily dispersable into a binder. Such results may be obtained via this process, yet surprisingly, the coating is such that it has little effect on the conductive properties of the particles. Although the exact nature of the coated particle is not known, it is believed that the polymer coating is sufficiently thin as not to affect the conductive properties of the particle yet sufficient to alter the surface characteristics of the particle. Alternatively, the coated particle may have a sufficient number of uncoated areas as not to insulate the coated particle. Finally, the polymer coating and the binder into which it is dispersed should be incompatible enough to permit a sufficient amount of agglomeration of the conductive particle so a conductive path is formed, if conductivity with relatively low levels of carbon is desired.

The coated particles and the compositions made therefrom will be readily understood from the following examples.

EXAMPLE I

Carbon black, i.e. 4 lb. of Vulcan XC-72P (Cabot Corp., average particle size 0.03 $\mu$) was blended with 0.5 lb of 20% Kynar (Polyvinylidene Fluoride from Pennwalt Corp) in dimethylformamide (DMF) solution in a 16 qt. Patterson-Kelley V Type Blender until a uniform consistency was achieved. This mixture was fed through a fluid energy mill set at 550° F inlet temperature, 470° F outlet temperature, and 75 psig inlet steam pressure at a rate equal to 54 lb/hr. The resulting product was an extremely fine, uniform black powder, indistinguishable in appearance from the carbon starting materials. The surface properties were markedly changed, however. Using 4% of a sodium naphthalene sulfonate wetting agent, it was possible to make a 30% solids carbon black concentrate in water which was an easily pourable fluid. In comparison, the uncoated control was stiff and completely non-fluid at this concentration.

EXAMPLE II

A 25% concentration of carbon slurry made as per Example I was blended with the following binder composition:

| | |
|---|---|
| 50% solids acrylic emulsion (AC61 from Rohn & Haas) | 59 lbs. |
| Colloidal silica (40% solids in water) | 200 lbs. |
| Clay | 34 lbs. |
| Deionized water | 142 lbs. |

Conductive elements were made with various blends of carbon slurry and binder composition generally via the method taught in U.S. Pat. No. 3,399,451. Resistance varied as follows:

Table I

| Ratio by weight of binder composition to carbon slurry | Resistance in ohms/square |
|---|---|
| 1:1 | 260 |
| 2:1 | 400 |
| 4:1 | 2,000 |
| 6:1 | 14,000 |
| 8:1 | 720,000 |

Coatings formulated with this coated carbon gave remarkably predictable and uniform resistivities, much better than can be achieved using uncoated carbon, utilizing the best known dispersants and mechanical treatment. Even more unusual is the fact that this coated carbon requires no other mechanical work than simple stirring to get a satisfactory dispersion.

EXAMPLE III

To 100 parts by weight of a 25% carbon slurry made as per Example I was added 34 parts of graphite coated with polyvinylidene fluoride as per Example I. The resulting conductive slurry was then blended with an acrylic emulsion coating similar to Example II. Conductive elements were made and tested as per Example II.

Table II

| Ratio by Weight of graphite-carbon slurry to composition | Resistance in Ohms/Square |
| --- | --- |
| 1:0.24 | 10 |
| 1:1 | 28 |
| 1:2.5 | 160 |

Coatings formulated using non-coated carbon particles and graphite gave very erratic resistivities and poor mechanical integrity. The coatings made from the coated particles were exceptional in resolving these weaknesses and in addition, created coatings with much lower resistivities than had previously been possible.

EXAMPLE IV

Sterling MT-NS carbon black (Cabot Corp.), 4.5 lb, was blended with 4.5 lb of well-crumbled 20% DPD 6181 (ethylene ethyl acrylate copolymer from Union Carbide Corp.) gel in xylene, and thoroughly mixed in a Patterson-Kelley Blender until a uniform consistency was achieved. This mixture was fed through the fluid energy mill set at 550° F inlet temperature, 470° F outlet temperature, and 75 psig inlet steam pressure at a rate of approximately 54 lb/hr. The product was uniform and very fine, with an average particle size of 4.0 $\mu$. (The reported particle size of the MT-NS starting material is 0.05 $\mu$.). The wetting and dispersion properties were consistent with those expected for a "coated" carbon black. The improved compatibility and bonding power of this "treated" carbon was demonstrated in a blend with low density polyethylene. A blend consisting of 300 parts of the treated carbon with 100 parts of Sinclair LDPC was prepared on a heated two-roll rubber mill. The product was a smooth, tough slab; tensile strength 2190 psi, elongation 30%. In contrast, an attempt to prepare a comparable compound using untreated Sterling MT-NS at the same loading level (i.e., 249 g MT-NS and 151 g Sinclair LDPE) was unsuccessful. At this attempted loading level, the binding power of the resin for the carbon filler was exceeded and only a crumbled mass was obtained.

An electrical test specimen was prepared by pressing a portion of the slab in a hot press (200° C) between two 1-9/16 in., 40-mesh steel wire screens to which copper strip leads had been welded. The sample was squeezed to a thickness of ⅛ in. and held in the hot press 12 minutes. Immediately after removal from the hot press, the sample was placed in a cold press for 5 minutes. The electrical resistance of the sample was checked at this time and after "annealing" for 8 hours at 150° C. The resistance in both cases was $>10^6\Omega$; much higher than one would expect for this high carbon loading level, indicating that the carbon particles were insulated one from the other and there was little reagglomeration of the carbon particles after annealing to form a "conductive path" through the specimen. The test indicated that by blending carbon particles "treated" with a high polymer which is compatible with the plastic into which it is blended, the carbon particles remain insulated and dispersed and will not reagglomerate even upon annealing.

EXAMPLE V

Twelve lb. of a well-crumbled gel of 10% Marlex 6003 high density polyethylene (HDPE), MI=0.3, d=0.96 from Phillips Petroleum Co.) in xylene was thoroughly mixed with 6 lb. of Sterling MT-NS carbon black in a Patterson-Kelley Blender for 5 minutes. The mixture was fed through the fluid energy mill set at 550° F inlet temperature, 470° F outlet temperature, and 75 psig steam inlet pressure, at a rate equal to 51 lb. per hour. The product was an extremely fine (approximately 1$\mu$), uniform powder. The wetting and surface properties of this "treated" carbon were consistent with those expected for a "coated" product.

EXAMPLE VI

A mixture of 3 lb. Vulcan XC-72P carbon black and 3 lb. of Microthene FN-500 (high density polyethylene (HDPE) powder, MI=20, d.=0.915, from U.S.I. Chemicals) was pre-blended in a Patterson-Kelley Blender, then passed through a fluid energy mill set at 550° F inlet temperature, 470° F outlet temperature, and 75 psig inlet steam pressure at a rate equal to 60 lb./hr. The product was extremely fine and uniform. The average particle size was 3.75 microns. The wetting and surface properties of this "treated" carbon were consistent with those expected for a "coated" product.

Two 70-g quantities of this "treated" carbon were blended with 180 g of DFD6040 (LDPE from Union Carbide Corporation, $d = 0.92$, $MI = 0.2$), compatible polymer, and 180 g of Profax 7523 (polypropylene from Hercules Powder Company), incompatible polymer, respectively. The blending was done in a 1-lb. Banbury mixer for a period of 10 minutes. The hot blends were then sheeted out into a slab approximately ¼ inch thick on a two-roll rubber mill. Electrical property test specimens were prepared as described in Example IV. The electrical resistance of these samples was checked at their time of preparation and after two "annealing" periods of 150° C for 16 hours. The results are summarized below.

|  | R Initial | R 1st Anneal | R 2nd Anneal |
| --- | --- | --- | --- |
|  | (ohms) | (ohms) | (ohms) |
| LDPE Binder | >10⁷ | >10⁷ | >10⁷ |
| Polypropylene Binder | >10⁷ | 1700 | 360 |

The results show that conductivity was poor in the case of the compatible coated carbon/polymer blend, while the conductivity was good in the case of the incompatible coated carbon/polymer blend. These differences in conductivity are believed to be due to the relative extent of dispersion of the coated carbon in these two binders. The carbon is well dispersed in the compatible system and, therefore, conducts poorly while the carbon in the incompatible system is relatively poorly dispersed and segregated into conductive channels and, therefore, has much better conductivity.

EXAMPLE VII

Hydral-705 (Hydrated aluminum oxide from Alcoa Aluminum Co.), 6.0 lb., and 4.8 lb. of 22% DYNH (Polyethylene from Union Carbide) gel in xylene were thoroughly premixed in a Patterson-Kelley Blender for 5 minutes. This mixture was fed through a fluid energy mill set at 550° F inlet temperature, 475° F outlet temperature, and 55 psig inlet steam pressure, at a rate equal to 60 lb./hr. The product was a fine, uniform, white powder. The particle size of the Hydral-705 before coating was 0.3μ, and after coating was 1.22 μ. The product was totally immiscible with water, but easily miscible in mineral oil, in contrast with the untreated mineral.

A sample of this "coated" Hydral, 100 g., was blended with 200 g. of DYNH (LDPE) on a hot two-roll rubber mill. The coated filler blended in rapidly and easily, giving a perfectly dispersed and smooth final product. In contrast, a comparable quantity of "untreated" Hydral blended into the DYNH slowly and with difficulty and the final product was obviously not as smooth.

EXAMPLE VIII

A uniform mixture of 6.0 lb. of Hydral-705 and 1.1 lb. Microthene FN500 (MI=20, d.=0.915), were fed through a fluid energy mill set at 550° F inlet temperature, 460° F outlet temperature, and 55 psig inlet steam pressure, at a rate equal to 28 lb./hr. The product was essentially identical to the sample prepared in Example VII. The average particle size was 2.1 μ.

EXAMPLE IX

A mixture of 2.0 lb. of Cab-O-Sil (silica from Cabot Corp.) and 6.1 lb. of well-crumbled 22% DYNH gel in xylene were pre-blended in a Patterson-Kelley Blender for about 5 minutes. This mixture was fed through the fluid energy mill set at 550° F inlet temperature, 485° F outlet temperature, and 55 psig inlet steam pressure, at a rate equal to 87 lb./hr. The product was a very fluffy, fine, white powder. The bulk density was more than twice that of the starting material, however. The product was totally water immiscible, but dispersed easily in organic solvents, such as xylene, hexane, and mineral oil. These properties are in sharp contrast with these of the untreated starting material. The particle size of the starting material was 0.2 μ (reported 0.01 μ); the particle size of the "coated" material was 0.3 μ.

EXAMPLE X

To the Patterson-Kelley Blender were charged 15.0 lb. of $Fe_3O_4$ (Pfizer BK5099 from Pfizer Chemical Co.) powder and 12.0 lb. of crumbled 22% DYNH gel in xylene. The mixture was "homogenized" for 10 minutes in the blender and then fed to the fluid energy mill set at 550° F inlet temperature, 475° F outlet temperature, and 55 psig inlet steam pressure, at a rate equal to 60 lb./hr. The product was a fine, uniform, black powder. The average particle size of the $Fe_3O_4$ before coating was 1.5 μ and after coating was 6.4 μ. The product was totally immiscible with water, but easily wet, and dispersed in organic media such as xylene or mineral oil. These wetting properties were completely the reverse of the untreated control sample.

EXAMPLE XI

Ten lbs. of N,N'- (p,p'-diphenyl)bis-3,4,5,6-tetrabromophthalimide in particulate form useful as a flame retardant was charged to a 16-qt. Patterson-Kelley Liquid Solids Blender, along with 6.8 lb. of well-crumbled 22% DYNH (LDPE) gel in xylene. The mixture was blended in the P-K mixer for 5 minutes. The resulting blend was of a damp, but free-flowing consistency. This material was fed through the fluid energy mill at a rate of 65 lb./hr. The mill was operated at 600° F inlet temperature, 500° F outlet temperature, and at a steam inlet pressure of 40 psig. The product was a uniform, free-flowing, fine, yellow powder. The average particle size of the starting material was 0.75 μ; the final coated product had an average size of 1.85 μ. The coated product was noticeable more oleophilic than the uncoated control.

The dispersion characteristics of the "coated" material was determined by compounding in a 5-lb. Banbury, a composition consisting of 36% high density polyethylene and 17% Ethylene-propylene rubber, 36% "coated" material, 11% antimony oxide. Tapes, 1 inch wide, 5 mils thick, were extruded from this composition and the number of particles per foot counted. A similar control sample was made up consisting of 40% high density polyethylene and 32% uncoated material, plus the other ingredients. The "coated" material showed an average of 168 particles, 2 mils or greater, per foot. The control sample showed an average of 7400 particles/ft.

EXAMPLE XII

The fluid energy mill was set at 550° F inlet steam temperature and 500° F outlet temperature. The inlet pressure was 50 psig. The organic powder of Example XI was metered into the mill at a rate of 51 lb./hr. Simultaneously, a hot 20% solution of DYNH in xylene was sprayed into the mill at the rate of 13.1/hr. The product was essentially identical to the sample prepared in Example XI.

The dispersion characteristic of the material were checked as in Example XI. The particle count on the resulting tapes was 1152 particles/ft, - significantly less than the control of 7400.

EXAMPLE XIII

A well-blended mixture of 6.0 lb. of the organic powder of Example XI and 1.06 lb. Microthene MU 760 (U.S.I. Chemicals, ethylene-vinyl acetate copolymer, M.I=20, d.=0.94, average particle size 500 μ) was fed into the fluid energy mill set at 550° F inlet temperature, 465° F outlet temperature, and an inlet pressure of 55 psig, at a rate equal to 53 lb. per hour. The product was a fine, yellow powder of average particle size 2.0 μ (particle size starting material 0.75 μ). The dispersion characteristics of the product were determined as in Example XI. The particle count on the resulting tapes was 120 particles/ft., 2 mil or greater.

EXAMPLE XIV

Regal 660R (medium size, low structure) carbon black, 5 lb., was preblended to a uniform consistency in a Patterson-Kelley Blender with 1.25 lb. of Viscasil 10,000 (high molecular weight silicone oil, G.E. Co.). This mixture was then fed through the fluid energy mill set at 550° F inlet temperature, about 500° F outlet temperature and 70 psig inlet steam pressure at a rate of approximately 60 lb./hr. The product was a fine, uniform black powder.

Three hundred parts of this "coated" carbon was compounded into 100 parts of Sinclair LDPE on a two-roll rubber mill. The compound was somewhat stiff, but processed satisfactorily. Electrical test specimens (4) were prepared as described in Example IV. The initial resistances of the test pieces were 813, 1568, 2090, and 2554Ω. The resistances of the samples after annealing for 8 hours at 300° F were 377, 361, 394, and 386Ω. Further heating at 300° F did not change the room temperature resistance levels appreciably.

The unusual features of this example are the high loading level of the carbon (not possible with uncoated carbon), rapid annealing rates, and good, stable levels of conductivity due presumably to the imcompatible nature of the coating on the carbon with the binder resin.

EXAMPLE XV

The fluid energy mill was operated at 610° F inlet steam temperature and 510° F outlet temperature. The inlet pressure was 45 psig. Twelve lb. of the organic powder of Example XI was metered into the mill at a rate of 58 lb./hr. Simultaneously, a solution of 500 g. poly (N,N' - dodecamethylene pyromellitimide) dissolved in 4 liters N-methyl-2-pyrrolidone was sprayed into the mill at the rate of 333 ml/min. The product was a uniform, free-flowing, fine powder. The coated flame retardant material was shown to have improved compatibility with poly (N,N'1dodecamethylene pyromellitimide).

What is claimed is:
1. A process for coating discrete particles of less than 20 microns with a high polymer coating comprising:
   injecting the polymer and particles into a chamber;
   injecting a fluid stream into the chamber under pressure and at an elevated temperature, said fluid propelling the polymer and particles at high velocities along an arcuate path having both a recycle and separation outlet, wherein said polymer and said particles undergo repeated high velocity impacts with each other thereby coating said particles with said polymer and wherein discrete particles of less than approximately 20 microns having the polymer coating thereon are separated out of the chamber, but agglomerated particles of greater than 20 microns are recycled around the arcuate path.
2. The process of claim 1 wherein the particles and polymer are preblended prior to injection into the chamber.
3. The process of claim 1 wherein the fluid is steam, said steam being injected into the chamber at temperatures between 125° C and 400° C at inlet pressure between 3 and 70 psi.
4. The process of claim 1 wherein the polymer is fed into the chamber in solution with a suitable solvent.
5. The process of claim 1 wherein the polymer is fed into the chamber as a finely divided polymer gel and said fluid is at a temperature sufficient to cause the polymer gel to melt.
6. The process of claim 1 wherein the polymer is fed into the chamber as a dry powder having a particle size of from 1–500 microns and said fluid is at a temperature sufficient to cause the polymer to melt.
7. The process of claim 1 wherein the particles to be coated are selected from the group consisting of carbon blacks, graphite, clay, talc, ground limestone, aluminum oxide, hydrated aluminum oxide, silica, hydrated silica gels and iron oxides.
8. The process of claim 1 wherein the high polymer is coated onto a conductive particle such that the particles are free-flowing and non-agglomerative but remain conductive when dispersed in a suitable binder.
9. The process of claim 1 wherein the particle to be coated is a halogenated organic compound useful as a flame retardant in polymeric compositions.
10. The process of claim 9 wherein said halogenated organic compound has the formula

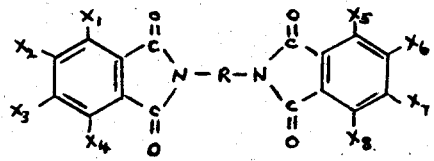

wherein $X_1$ through $X_8$ which can be the same or different are independently hydrogen, fluorine, chlorine, bromine, or iodine, and wherein at least one of $X_1$ to $X_4$ and also at least one of $X_5$ to $X_8$ is chlorine or bromine and wherein R is $C_1$ to $C_{20}$ alkenyl; $C_6$ to $C_{20}$ cycloalkenyl; $C_6$ to $C_{20}$ arylene or halogen substituted arylene or alkyl substituted arylene or fused arylene, or the moiety $R_1$-Z-$R_2$ wherein $R_1$ and $R_2$, which can be the same or different, are independently $C_1$ to $C_{20}$ alkenyl; $C_6$ to $C_{20}$ cycloalkenyl; $C_6$ to $C_{20}$ arylene, halogen substituted arylene, alkyl substituted arylene, or fused ring arylene, and wherein Z is sulfur, oxygen, isopropylidene, or a chemical bond joining $R_1$ and $R_2$.
11. The process of claim 9 wherein the particle to be coated is N,N' (p,p'-diphenyl) bis-3,4,5,6-tetrabromophthalimide.
12. The process of claim 8 wherein the conductive particles are carbon.
13. The process of claim 8 wherein the high polymer is polyvinylidene fluoride.

* * * * *